United States Patent
Liu et al.

(10) Patent No.: US 8,986,632 B2
(45) Date of Patent: Mar. 24, 2015

(54) PROCESS FOR RECOVERY OF COBALT, RUTHENIUM, AND ALUMINUM FROM SPENT CATALYST

(71) Applicant: Sunshine Kaidi New Energy Group Co., Ltd., Wuhan (CN)

(72) Inventors: Qianqian Liu, Wuhan (CN); Yiming Han, Wuhan (CN); Dechen Song, Wuhan (CN); Li Xu, Wuhan (CN); Bo Lai, Wuhan (CN)

(73) Assignee: Sunshine Kaidi New Energy Group Co., Ltd., Wuhan (CN)

(*) Notice: Subject to any disclaimer, the term of this patent is extended or adjusted under 35 U.S.C. 154(b) by 0 days.

(21) Appl. No.: 14/477,935

(22) Filed: Sep. 5, 2014

(65) Prior Publication Data
US 2014/0377151 A1   Dec. 25, 2014

Related U.S. Application Data

(63) Continuation-in-part of application No. PCT/CN2013/072119, filed on Mar. 4, 2013.

(51) Int. Cl.
  C22B 11/00   (2006.01)
  C22B 3/00    (2006.01)
  C22B 11/06   (2006.01)
  C22B 21/02   (2006.01)

(52) U.S. Cl.
  CPC ............. *C22B 23/0446* (2013.01); *C22B 11/06* (2013.01); *C22B 21/02* (2013.01); *C22B 11/04* (2013.01)
  USPC ............................................. 423/22; 423/138

(58) Field of Classification Search
  None
  See application file for complete search history.

(56) References Cited

FOREIGN PATENT DOCUMENTS

CN            101270420 A   *   9/2008

* cited by examiner

*Primary Examiner* — Melissa Swain
(74) *Attorney, Agent, or Firm* — Matthias Scholl P.C.; Matthias Scholl

(57) ABSTRACT

A method for recovering cobalt, ruthenium, and aluminum from spent Co—Ru/$Al_2O_3$ catalyst. First, Co—Ru/$Al_2O_3$ spent catalyst is subjected to hydrocarbon removal, reaction with hydrogen, and alkali fusion to obtain a slag. The slag is subjected to acid leaching, precipitation of cobalt with oxalic acid or ammonium oxalate, reduction of cobalt oxalate, and dissolution of cobalt metal with nitric acid to obtain $Co(NO_3)_2 \cdot 6\,H_2O$. The effluent of acid leaching is subjected to reaction with ethanol, filtration to obtain a filtrate and residue, dissolution of the residue with concentrated hydrochloric acid, and vacuum distillation to obtain $\beta$-$RuCl_3 \cdot x\,H_2O$. Aluminum hydroxide is prepared from the filtrate through carbonation and calcination. The cobalt yield is ≥97%; the ruthenium yield is ≥95%, and the aluminum yield is ≥92%.

18 Claims, 1 Drawing Sheet

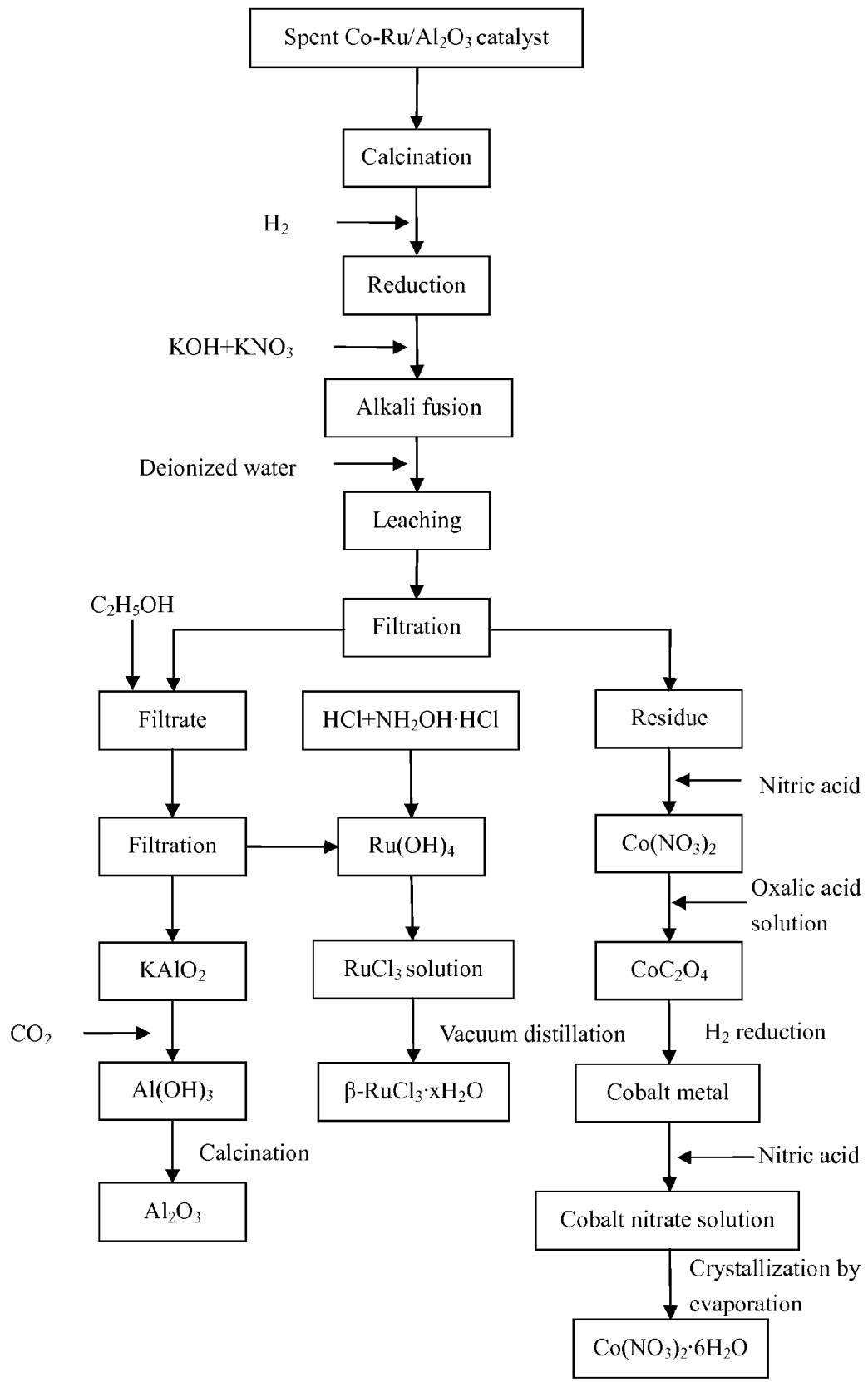

PROCESS FOR RECOVERY OF COBALT, RUTHENIUM, AND ALUMINUM FROM SPENT CATALYST

CROSS-REFERENCES TO RELATED APPLICATIONS

This application is a continuation-in-part of International Patent Application No. PCT/CN2013/072119 with an international filing date of Mar. 4, 2013, designating the United States, now pending, and further claims priority benefits to Chinese Patent Application No. 201210055817.X filed Mar. 5, 2012. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, Mass. 02142.

BACKGROUND OF THE INVENTION

1. Field of the Invention

This invention relates to a method for recovering cobalt, ruthenium, and aluminum from spent Co—Ru/$Al_2O_3$ catalyst.

2. Description of the Related Art

Renewable alternative liquid fuels are a possible solution to the problems of approaching oil depletion and increasing environmental pollution.

Fischer-Tropsch synthesis converts synthesis gas prepared by gasification of carbon-containing substances such as natural gas, coal, and biomass into liquid fuel (also called synthetic oil) with the aid of Fischer-Tropsch catalysts. Synthetic oil is a clean, renewable fuel that can be converted into gasoline or diesel by consequent treatment such as distillation.

The main metal active components of Fischer-Tropsch catalysts include the metal elements of Group VIII, such as iron, cobalt, nickel, and ruthenium. Cobalt-based catalyst is a hot topic in research and application of Fischer-Tropsch catalysts due to its outstanding catalytic ability. Ruthenium exhibits the highest catalytic activity, but its application is limited by its scarcity and high price. Thus, ruthenium is usually used as a promoter to improve the selectivity and activity of a catalyst.

Aluminum oxide has a high melting point, excellent thermal stability, and good wear resistance. It is widely used as a carrier for Fischer-Tropsch catalysts. For example, the weight percentage amount of aluminum oxide in the Fischer-Tropsch catalysts used in slurry bed is more than 50%.

Recovering cobalt, ruthenium, and aluminum from deactivated Fischer-Tropsch catalysts and recycling them into metal salts or oxides that can be used in preparation of catalysts is a method to reduce environmental pollution as well as production cost of the catalysts.

In one conventional method for recovering cobalt from cobalt-based catalysts carried on aluminum oxide, carbon monoxide is introduced into a reactor containing deionized water and spent cobalt-based catalyst containing $SiO_2$, $Al_2O_3$, $ZrO_2$, or $TiO_2$ as carriers and heated at a constant temperature. Next, the reactor is cooled down and the carbon monoxide in the reactor is released. After that, the solution containing cobalt is released from the reactor and a lye is added to the solution to precipitate the cobalt therein as $Co(OH)_2$. Nitric acid is added to the precipitate to dissolve it. After evaporation, $Co(NO_3)_2 \cdot 6 H_2O$ is obtained. The $Co(NO_3)_2 \cdot 6 H_2O$ obtained by this method has a purity lower than 99% and cannot he directly used in preparation of cobalt-based catalysts.

In another method for recovering cobalt, a spent cobalt-based catalyst on aluminum oxide carrier is ground, dissolved in concentrated hydrochloric acid, precipitated by sodium sulfide, precipitated by oxalic acid, calcined, dissolved in nitric acid, and crystallized by evaporation so as to obtain $Co(NO_3)_2 \cdot 6 H_2O$ having a purity higher than 99%. However, because the metal oxide in the spent catalyst is not reduced and because the intermediate CoS produced in the recovery process is in a form of tiny particles, cobalt is likely to be lost during filtration, which leads to a low cobalt recovery rate around 92%.

Among the known methods for recovering ruthenium from spent catalysts, the most widely used one is an alkali fusion-oxidization distillation method for recovery of a ruthenium-based catalyst on an activated carbon carrier. In this method, the ruthenium-based catalyst is calcined at 600-1000° C. to remove the activated carbon carrier, and is then mixed with KOH and $KNO_3$ and heated at 300-950° C. for 1-5 hours to conduct an alkali fusion reaction. After cooling, an alkali fusion product is obtained. The alkali fusion product is dissolved in water at a temperature of 50-90° C. to obtain a $K_2RuO_4$ solution. Then, sodium hypochlorite and concentrated sulfuric acid are added to the solution and refluxed at 50-90° C. for 2-4 hours to produce $RuO_4$ gas. The $RuO_4$ gas is absorbed by a strong acid solution and then distilled under atmospheric pressure or a reduced pressure to obtain a ruthenium salt. Because $RuO_4$ produced in the distillation process is a strong oxidizer and is explosive and highly toxic, the reactions must be performed in a closed fume hood. Furthermore, the procedure of this method is complex and long.

There is another method for recovering ruthenium from a used catalyst containing ruthenium oxide and a carrier which is difficult to dissolve in inorganic acids. In this method, first, the catalyst is treated with hydrogen flow so that the ruthenium oxide in the catalyst is reduced to ruthenium metal. Next, the catalyst is treated with hydrochloric acid in an oxygen atmosphere so that the ruthenium metal on the carrier is dissolved. The obtained ruthenium (III) chloride solution is subjected to further treatment. This method has a low ruthenium recovery rate and is not suitable for recovery of catalysts containing γ-$Al_2O_3$ as a carrier.

The aforementioned methods are focused on recovery of a single metal rather than on recovery of cobalt, ruthenium, and aluminum simultaneously. Due to the different properties of the metals, the recovery rates and purities of the metals changes dramatically in accordance with the recovery method.

SUMMARY OF INVENTION

It is an object of the present invention to provide a safe, efficient method for recovering cobalt, ruthenium, and aluminum from spent Co—Ru/$Al_2O_3$ catalysts for Fischer-Tropsch synthesis.

The method for recovering metal cobalt, ruthenium, and aluminum from spent Co—Ru/$Al_2O_3$ catalysts for Fischer-Tropsch synthesis described in this present invention comprises the following steps:

1) transferring loose particles of a spent Co—Ru/$Al_2O_3$ catalyst to a muffle furnace; then introducing air into the muffle furnace and calcining the loose particles at 350-500° C. for 3-6 hours to remove the heavy hydrocarbons on the surface of the catalyst particles; and then cooling the particles down to room temperature;

2) grinding the particles obtained in step 1) into powders; transferring the powders to a fluidized bed reactor; purging the fluidized bed reactor with nitrogen for 0.5 hour; and then heating the powders in a mixed atmosphere containing $H_2$ and $N_2$ at a $H_2$-to-$N_2$ volume ratio of 1:1-4:1, a space velocity of 1000-4000 $h^{-1}$, a pressure of 0.1-1 MPa, and a temperature of 350-800° C. for 8-12 hours;

3) disposing the heated powders obtained in step 2) and alkali fusing agents into layers in a crucible, then transferring the crucible to a muffle furnace; heating the muffle furnace at 200° C. for 1 hour; then increasing the temperature of the muffle furnace by 3° C./min to a temperature falling within the range of 900-1000° C. using a temperature program and maintaining the muffle furnace at this temperature to conduct an alkali fusion reaction for 2-4 hours; and then cooling the muffle furnace to room temperature to obtain an alkali fusion product;

4) leaching the alkali fusion product obtained in step 3) in deionized water at a temperature of 90-100° C. and a solid-to-liquid weight ratio of 1:2-1:4 for 0.5-1 hour to dissolve the water-soluble $K_2RuO_4$ and $KAlO_2$, or $Na_2RuO_4$ and $NaAlO_2$, in the alkali fusion product, and then filtering to obtain a residue;

5) washing the residue obtained in step 4) until the effluent reaches a neutral pH, and then adding excess dilute nitric acid to dissolve the cobalt metal and cobalt oxide to obtain a cobalt nitrate solution;

6) adjusting the cobalt nitrate solution obtained in step 5) to a $Co^{2+}$ concentration of 20 g/L, a pH of 1.5, and a temperature of 70° C.; adding oxalic acid solution or ammonium oxalate solution at a pH of 1.5 and a temperature of 70° C. to precipitate cobalt ions as cobalt oxalate, the molar amount of the oxalic acid in the oxalic acid solution or the molar amount of the ammonium oxalate in the ammonium oxalate solution being 3-4 times that of the cobalt; hot-filtering and washing the residue with deionized water at a temperature of 65-80° C.; dehydrating the residue with absolute ethanol to obtain a pink cobalt oxalate precipitate; the cobalt oxalate is produced according to the following chemical reactions:

$Co(NO_3)_2 + H_2C_2O_4 + 2\ H_2O \rightarrow CoC_2O_4 \cdot 2\ H_2O \downarrow + 2\ HNO_3$; or $Co(NO_3)_2 + (NH_4)_2C_2O_4 + 2\ H_2O \rightarrow CoC_2O_4 \cdot 2\ H_2O \downarrow + 2\ NH_4NO_3$;

7) drying the pink cobalt oxalate obtained in step 6) in a dryer at 80-110° C.; then transferring the cobalt oxalate to a fluidized bed reactor; purging the fluidized bed reactor with nitrogen for 0.5 hour; and then reducing the cobalt oxalate in a mixed atmosphere containing $H_2$ and $N_2$ at a $H_2$-to-$N_2$ volume ratio of 1:1-4:1, a temperature of 400-560° C., a pressure of 0.1-1 MPa, and a space velocity of 1000-4000 $h^{-1}$ for 2-4 hours to obtain cobalt metal; the cobalt metal is produced according to the following chemical reaction:

$CoC_2O_4 \cdot 2\ H_2O \rightarrow Co + 2\ CO_2 + 2\ H_2O$;

8) adding dilute nitric acid to the cobalt metal obtained in step 7) until the cobalt metal just completely dissolves, then evaporating to obtain $Co(NO_3)_2 \cdot 6\ H_2O$;

9) mixing the filtrate of step 4) and the effluent of step 5); then adding absolute ethanol dropwise to the mixture and stirring to produce black ruthenium hydroxide precipitate; then filtering the precipitate and washing it with deionized water at a temperature of 65-80° C. until the effluent reaches a neutral pH and does not contain potassium or sodium ions; then washing the precipitate with absolute ethanol for three times; the ruthenium hydroxide precipitate is produced according to the following chemical reactions:

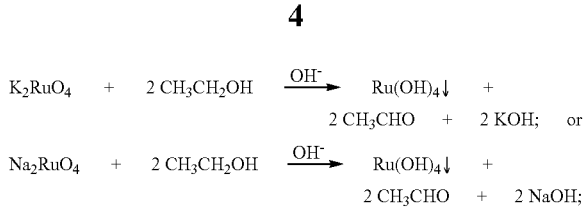

10) transferring the ruthenium hydroxide obtained in step 9) to a three-necked flask equipped with stirring and refluxing devices; adding concentrated hydrochloric acid to the three-necked flask and stirring at 91-95° C. for 1-2 hours; then adding hydroxylammonium chloride to completely dissolve the black ruthenium hydroxide, allowing the obtained solution to stand, and then transferring the solution to a distilling flask and vacuum-distilling at 40±1 kPa until the solution is converted into a paste; and then stopping vacuum distillation to allow the liquid in the paste to evaporate spontaneously to obtain $\beta$-$RuCl_3 \cdot x\ H_2O$ in crystal form; the $\beta$-$RuCl_3 \cdot x\ H_2O$ is produced according to the following chemical reactions:

$Ru(OH)_4 + 4\ HCl \rightarrow RuCl_4 + 4\ H_2O$; and $2\ RuCl_4 + 2\ NH_2OH \cdot HCl \rightarrow 2\ RuCl_3 + N_2 \uparrow + 4\ HCl + 2\ H_2O$;

11) mixing the filtrate obtained from filtration of the ruthenium hydroxide precipitate and the effluent obtained from washing the precipitate in step 9), introducing $CO_2$ having a purity higher than 99.0% into the mixed liquid and stirring at 25-95° C. to produce white aluminum hydroxide precipitate, stopping the reaction when the pH of the mixed liquid reaches 10.0; filtering and then washing the precipitate with deionized water at a temperature of 65-80° C. until the effluent reaches a neutral pH and does not contain potassium or sodium ions; and then washing the precipitate with absolute ethanol for three times; the aluminum hydroxide precipitate is produced according to the following chemical reactions:

$2\ KAlO_2 + CO_2 + 3\ H_2O \rightarrow K_2CO_3 + 2\ Al(OH)_3 \downarrow$; or $2\ NaAlO_2 + CO_2 + 3\ H_2O \rightarrow Na_2CO_3 + 2\ Al(OH)_3 \downarrow$;

12) drying the aluminum hydroxide at 80-130° C., and then calcining the dried aluminum hydroxide at 500-750° C. to obtain aluminum oxide; the aluminum oxide is produced according to the following chemical reaction:

$2\ Al(OH)_3 \rightarrow Al_2O_3 + 3\ H_2O$.

In a class of this embodiment, the alkali fusing agents in step 3) are KOH and $KNO_3$, or NaOH and $NaNO_3$.

In a class of this embodiment, the alkali fusion product is produced according to the following chemical reactions:

$RuO_2 + 2\ KOH + KNO_3 \rightarrow K_2RuO_4 + KNO_2 + H_2O$;

$Ru + 2\ KOH + 3\ KNO_3 \rightarrow K_2RuO_4 + 3\ KNO_2 + H_2O$; and $Al_2O_3 + 2\ KOH \rightarrow 2\ KAlO_2 + H_2O$;

Or $RuO_2 + 2\ NaOH + NaNO_3 \rightarrow Na_2RuO_4 + NaNO_2 + H_2O$;

$Ru + 2\ NaOH + 3\ NaNO_3 \rightarrow Na_2RuO_4 + 3\ NaNO_2 + H_2O$; and $Al_2O_3 + 2\ NaOH \rightarrow 2\ NaAlO_2 + H_2O$.

The amount of the alkali fusing agents used is 2.5 times the theoretical amount thereof.

In a class of this embodiment, in step 3), the alkali fusion is layered alkali fusion containing four layers. From the bottom of the crucible upward, ⅔ of the total amount of KOH, the heated powders, ⅓ of the total amount of KOH, and $KNO_3$ are disposed into layers; or ⅔ of the total amount of NaOH, the heated powders, ⅓ of the total amount of NaOH, and $NaNO_3$ are disposed into layers. Layered alkali fusion avoids sintering and evaporation of $RuO_4$ so as to reduce loss of ruthenium.

In a class of this embodiment, in step 3), the temperature of alkali fusion is 950-1000° C. for achieving complete reaction of ruthenium and aluminum oxide with the alkali fusing agents.

In a class of this embodiment, in step 3), the reaction time of alkali fusion is 3 hours.

In a class of this embodiment, in step 4), the alkali fusion product is leached in deionized water at a temperature of 96-100° C. to ensure that the ruthenate and, more importantly, the aluminate can be completely leached out.

In a class of this embodiment, in step 4), the solid-to-liquid weight ratio is 1:3.

In a class of this embodiment, the concentration of the dilute nitric acid in steps 5) and 8) is 1-3 mol/L.

In a class of this embodiment, in step 6), the oxalic acid solution or ammonium oxalate solution is slowly, dropwise added to the cobalt nitrate solution while 5% ammonium water is added to maintain the pH of the solution at 1.5-1.7 so that the cobalt in the solution is completely precipitated to achieve a high recovery rate thereof.

In a class of this embodiment, the temperature for reducing cobalt oxalate in step 7) is 400-480° C.

In a class of this embodiment, in step 9), the ethanol is excess so as to completely convert ruthenate into ruthenium hydroxide precipitate. The molar ratio of the ruthenium in the spent ruthenium-based catalyst to the absolute ethanol is 1:3-1:5.

In a class of this embodiment, the concentrated hydrochloric acid in step 10) has a mass fraction of 36-38%.

In a class of this embodiment, in step 10), the molar ratio of the hydroxylammonium chloride to the ruthenium element is 1:1, which helps to achieve a high purity of the $\beta$-$RuCl_3$.x $H_2O$.

In a class of this embodiment, in step 11), in order to produce aluminum hydroxide with a large particle size that can be easily filtered, the reaction temperature is preferable to be 65-85° C.

In a class of this embodiment, in step 11), the flow rate of the $CO_2$ is 500-1500 mL/min.

Advantages of the invention are summarized bellow:
1) the method described herein can effectively separate and recover cobalt, ruthenium, and aluminum from spent Co—Ru/$Al_2O_3$ catalysts for Fischer-Tropsch synthesis;
2) through the method described herein, $Co(NO_3)_2$.6 $H_2O$ with a purity higher than 99% is obtained. The obtained $Co(NO_3)_2$.6 $H_2O$ does not contain chloride and sulfide ions that will cause catalyst poisoning during Fischer-Tropsch process. Therefore, the obtained $Co(NO_3)_2$.6 $H_2O$ can be directly used to prepare Fischer-Tropsch catalysts;
3) the procedure for producing $\beta$-$RuCl_3$.x $H_2O$ in the method described herein is safe since it does not produce toxic, explosive $RuO_4$ gas;
4) through carbonation which is performed at a controlled temperature and carbon dioxide flow rate and ends at a controlled pH, aluminum hydroxide is prepared from an aluminate solution. Aluminum oxide is obtained by calcining the aluminum hydroxide. The preparation process is economic and environmentally friendly;
5) the method described herein achieves high metal recovery rates. Specifically, the cobalt recovery rate is higher than 97%; the ruthenium recovery rate is higher than 95%; and the aluminum recovery rate is higher than 92%; and
6) the method described herein is safe and simple. The equipment and material used therein is cheap and easy to get, leading to low cost and rendering the method suitable for industrial production.

BRIEF DESCRIPTION OF THE DRAWINGS

The sole FIGURE is a flow diagram of a method for recovering cobalt, ruthenium, and aluminum from a spent Co—Ru/$Al_2O_3$ catalyst.

DETAILED DESCRIPTION OF THE INVENTION

The invention is explained in further detail below. It should be noted that the following examples are intended to describe and not to limit the invention.

Example 1

1) 20.23 g of loose particles of a spent Co—Ru/$Al_2O_3$ catalyst were provided. Elemental analysis determined that the catalyst contained Co 30.05%, Ru 4.83%, and Al 27.90%. The loose particles of the spent Co—Ru/$Al_2O_3$ catalyst were transferred to a muffle furnace and air was introduced into the muffle furnace. The catalyst particles were calcined at 500° C. for 3 hours to remove the heavy hydrocarbons on the surface thereof and then cooled down to room temperature.

2) The particles obtained in step 1) were ground into powders and then transferred to a fluidized bed reactor. The powders were heated in a mixed atmosphere containing $H_2$ and $N_2$ at a $H_2$-to-$N_2$ volume ratio of 4:1, a space velocity of 1000 $h^{-1}$, a pressure of 1 MPa, and a temperature of 800° C. for 10 hours.

3) The heated powders obtained in step 2) and alkali fusing agents were disposed into layers in a crucible. The layers disposed from the bottom of the crucible upward contained 21.31 g of KOH, the heated powders, 10.65 g of KOH, and 7.32 g of $KNO_3$, respectively. The crucible was then transferred to a muffle furnace. The muffle furnace was then heated at 200° C. for 1 hour. After that, the temperature of the muffle furnace was increased by 3° C./min to 950° C. using a temperature program. The muffle furnace was maintained at 950° C. to conduct an alkali fusion reaction for 3 hours. Next, the muffle furnace was cooled down to room temperature to obtain an alkali fusion product.

4) The alkali fusion product obtained in step 3) was leached in deionized water at 90° C. and a solid-to-liquid weight ratio of 1:2 for 1 hour to completely dissolve the water-soluble $K_2RuO_4$ and $KAlO_2$, and then filtered to obtain a residue.

5) The residue obtained in step 4) was washed until the effluent reached a neutral pH. Next, 300 mL of 3 mol/L dilute nitric acid was added to completely dissolve the cobalt metal and cobalt oxide in the residue to obtain a cobalt nitrate solution.

6) The cobalt nitrate solution obtained in step 5) was adjusted to a $Co^{2+}$ concentration of 20 g/L. The pH of the solution was adjusted to 1.5 by using ammonium water with a mass fraction of 10%, and the temperature of the solution was adjusted to 70° C. The cobalt nitrate solution was slowly mixed with an oxalic acid solution at a pH of 1.5 and a temperature of 70° C. to precipitate cobalt ions as cobalt oxalate while ammonium water with a mass fraction of 5% was added to the solution to maintain the pH thereof at 1.5-1.7. After precipitation was completed, the obtained mixture was hot-filtered and the precipitate was washed with deionized water at a temperature of 65-80° C. until the effluent reached a neutral pH. The washed precipitate was dehydrated with absolute ethanol to obtain a pink cobalt oxalate precipitate. The oxalic acid solution used was prepared by: adding deionized water until 39.01 g of solid oxalic acid ($H_2C_2O_4.2H_2O$) just dissolves, and adding 5% ammonium water to adjust the pH of the solution to 1.5.

7) The cobalt oxalate obtained in step 6) was dried in a dryer at 80° C., then transferred to a fluidized bed reactor and reduced in a mixed atmosphere containing $H_2$ and $N_2$ at a $H_2$-to-$N_2$ volume ratio of 3:1, a temperature of 560° C., a pressure of 0.5 MPa, and a space velocity of 4000 $h^{-1}$ for 2 hours to obtain cobalt metal.

8) The cobalt metal obtained in step 7) was dissolved in a sufficient amount of 3 mol/L dilute nitric acid. The obtained mixture was evaporated to obtain $Co(NO_3)_2.6 H_2O$. The $Co(NO_3)_2.6 H_2O$ was cooled in a dryer and then weighed. The obtained $Co(NO_3)_2.6 H_2O$ was 29.52 g, the purity of which measured by GBT 15898-1995 method was 99.41%. The recovery rate of cobalt was 97.75%.

9) The filtrate of step 4) and the effluent of step 5) were mixed. 30 mL of absolute ethanol was slowly, dropwise added to the mixture and stirred to produce black ruthenium hydroxide precipitate. The precipitate was filtered and washed with deionized water at a temperature of 65-80° C. until the effluent reached a neutral pH and did not contain potassium ions. After that, the precipitate was washed with absolute ethanol for three times.

10) The black ruthenium hydroxide precipitate obtained in step 9) was transferred to a three-necked flask equipped with stirring and refluxing devices. Concentrated hydrochloric acid with a mass fraction of 36-38% was added to the three-necked flask. The mixture was stirred at 91-95° C. for 2 hours. Next, 0.67 g of hydroxylammonium chloride was added to completely dissolve the black ruthenium hydroxide. The obtained solution was allowed to stand for a while, and then transferred to a distilling flask and vacuum-distilled at 40±1 kPa until the solution was converted into a paste. Next, vacuum distillation was stopped to allow the liquid in the paste to evaporate spontaneously to obtain 2.415 g of β-$RuCl_3$.x $H_2O$. ICP-AES method determined that the β-$RuCl_3$.x $H_2O$ had a ruthenium content of 38.58%. The recovery rate of ruthenium was 95.36%.

11) The filtrate obtained from the filtration of the ruthenium hydroxide precipitate and the effluent obtained from washing the precipitate in step 9) were mixed together. The mixture was heated to 95° C., and $CO_2$ having a purity higher than 99.0% was introduced into the mixture at a flow rate of 1500 mL/min and stirred to produce white aluminum hydroxide precipitate. The reaction was completed when the pH of the solution reached 10.0. The precipitate was filtered and then washed with deionized water until the effluent reached a neutral pH and did not contain potassium ions. After that, the precipitate was washed with absolute ethanol for three times.

12) The aluminum hydroxide was dried at 120° C., then calcined at 500° C. to obtain 10.04 g of aluminum oxide having a purity of 99.31%. The recovery rate of aluminum was 93.47%.

Example 2

1) 20.74 g of loose particles of a spent Co—Ru/$Al_2O_3$ catalyst were provided. Elemental analysis determined that the catalyst contained Co 25.33%, Ru 3.07%, and Al 32.53%. The loose particles of the spent Co—Ru/$Al_2O_3$ catalyst were transferred to a muffle furnace and air was introduced into the muffle furnace. The catalyst particles were calcined at 350° C. for 6 hours to remove the heavy hydrocarbons on the surface thereof and then cooled down to room temperature.

2) The particles obtained in step 1) were ground into powders and then transferred to a fluidized bed reactor. The powders were heated in a mixed atmosphere containing $H_2$ and $N_2$ at a $H_2$-to-$N_2$ volume ratio of 2:1, a space velocity of 3000 $h^{-1}$, a pressure of 0.8 MPa, and a temperature of 700° C. for 11 hours.

3) The heated powders obtained in step 2) and alkali fusing agents were disposed into layers in a crucible. The layers disposed from the bottom of the crucible upward contained 17.50 g of NaOH, the heated powders, 8.75 g of NaOH, and 4.02 g of $NaNO_3$, respectively. The crucible was then transferred to a muffle furnace. The muffle furnace was then heated at 200° C. for 1 hour. After that, the temperature of the muffle furnace was increased by 3° C./min to 900° C. using a temperature program. The muffle furnace was maintained at 900° C. to conduct an alkali fusion reaction for 4 hours. Next, the muffle furnace was cooled down to room temperature to obtain an alkali fusion product.

4) The alkali fusion product obtained in step 3) was leached in deionized water at 95° C. and a solid-to-liquid weight ratio of 1:3 for 0.5 hour to completely dissolve the water-soluble $Na_2RuO_4$ and $NaAlO_2$, and then filtered to obtain a residue.

5) The residue obtained in step 4) was washed until the effluent reached a neutral pH. Next, 360 mL of 2 mol/L dilute nitric acid was added to completely dissolve the cobalt metal and cobalt oxide in the residue to obtain a cobalt nitrate solution.

6) The cobalt nitrate solution obtained in step 5) was adjusted to a $Co^{2+}$ concentration of 20 g/L. The pH of the solution was adjusted to 1.5 by using ammonium water with a mass fraction of 10%, and the temperature of the solution was adjusted to 70° C. The cobalt nitrate solution was slowly mixed with an ammonium oxalate solution at a pH of 1.5 and a temperature of 70° C. to precipitate cobalt ions as cobalt oxalate while ammonium water with a mass fraction of 5% was added to the solution to maintain the pH thereof at 1.5-1.7. After precipitation was completed, the obtained mixture was hot-filtered and the precipitate was washed with deionized water at a temperature of 65-80° C. until the effluent reached a neutral pH. The washed precipitate was dehydrated with absolute ethanol to obtain a pink cobalt oxalate precipitate. The ammonium oxalate solution used was prepared by: adding deionized water until 44.30 g of solid ammonium oxalate (($NH_4)_2C_2O_4.H_2O$) just dissolves, and adding 5% ammonium water to adjust the pH of the solution to 1.5.

7) The cobalt oxalate obtained in step 6) was dried in a dryer at 90° C., then transferred to a fluidized bed reactor and reduced in a mixed atmosphere containing $H_2$ and $N_2$ at a $H_2$-to-$N_2$ volume ratio of 2:1, a temperature of 500° C., a pressure of 0.8 MPa, and a space velocity of 3000 $h^{-1}$ for 3 hours to obtain cobalt metal.

8) The cobalt metal obtained in step 7) was dissolved in a sufficient amount of 2 mol/L dilute nitric acid. The obtained mixture was evaporated to obtain $Co(NO_3)_2.6 H_2O$. The $Co(NO_3)_2.6 H_2O$ was cooled in a dryer and then weighed. The obtained $Co(NO_3)_2.6 H_2O$ was 25.59 g, the purity of which measured by GBT 15898-1995 method was 99.26%. The recovery rate of cobalt was 97.90%.

9) The filtrate of step 4) and the effluent of step 5) were mixed. 20 mL of absolute ethanol was slowly, dropwise added to the mixture and stirred to produce black ruthenium hydroxide precipitate. The precipitate was filtered and washed with deionized water at a temperature of 65-80° C. until the effluent reached a neutral pH and did not contain sodium ions. After that, the precipitate was washed with absolute ethanol for three times.

10) The black ruthenium hydroxide precipitate obtained in step 9) was transferred to a three-necked flask equipped with stirring and refluxing devices. Concentrated hydrochloric acid with a mass fraction of 36-38% was added to the three-necked flask. The mixture was stirred at 91-95° C. for 1.5 hours. Next, 0.44 g of hydroxylammonium chloride was added to completely dissolve the black ruthenium hydroxide. The obtained solution was allowed to stand for a while, and then transferred to a distilling flask and vacuum-distilled at 40±1 kPa until the solution was converted into a paste. Next, vacuum distillation was stopped to allow the liquid in the paste to evaporate spontaneously to obtain 1.603 g of $\beta$-$RuCl_3$.x $H_2O$. ICP-AES method determined that the $\beta$-$RuCl_3$.x $H_2O$ had a ruthenium content of 37.96%. The recovery rate of ruthenium was 95.59%.

11) The filtrate obtained from the filtration of the ruthenium hydroxide precipitate and the effluent obtained from washing the precipitate in step 9) were mixed together. The mixture was heated to 65° C., and $CO_2$ having a purity higher than 99.0% was introduced into the mixture at a flow rate of 1200 mL/min and stirred to produce white aluminum hydroxide precipitate. The reaction was completed when the pH of the solution reached 10.0. The precipitate was filtered and then washed with deionized water until the effluent reached a neutral pH and did not contain sodium ions. After that, the precipitate was washed with absolute ethanol for three times.

12) The aluminum hydroxide was dried at 80° C., then calcined at 600° C. to obtain 11.93 g of aluminum oxide having a purity of 98.95%. The recovery rate of aluminum was 92.64%.

Example 3

1) 19.96 g of loose particles of a spent Co—Ru/$Al_2O_3$ catalyst were provided. Elemental analysis determined that the catalyst contained Co 18.94%, Ru 2.11%, and Al 37.80%. The loose particles of the spent Co—Ru/$Al_2O_3$ catalyst were transferred to a muffle furnace and air was introduced into the muffle furnace. The catalyst particles were calcined at 400° C. for 5 hours to remove the heavy hydrocarbons on the surface thereof and then cooled down to room temperature.

2) The particles obtained in step 1) were ground into powders and then transferred to a fluidized bed reactor. The powders were heated in a mixed atmosphere containing $H_2$ and $N_2$ at a $H_2$-to-$N_2$ volume ratio of 3:1, a space velocity of 2000 $h^{-1}$, a pressure of 0.5 MPa, and a temperature of 350° C. for 12 hours.

3) The heated powders obtained in step 2) and alkali fusing agents were disposed into layers in a crucible. The layers disposed from the bottom of the crucible upward contained 19.19 g of NaOH, the heated powders, 9.59 g of NaOH, and 2.66 g of $NaNO_3$, respectively. The crucible was then transferred to a muffle furnace. The muffle furnace was then heated at 200° C. for 1 hour. After that, the temperature of the muffle furnace was increased by 3° C./min to 1000° C. using a temperature program. The muffle furnace was maintained at 1000° C. to conduct an alkali fusion reaction for 2 hours. Next, the muffle furnace was cooled down to room temperature to obtain an alkali fusion product.

4) The alkali fusion product obtained in step 3) was leached in deionized water at 100° C. and a solid-to-liquid weight ratio of 1:4 for 0.5 hour to completely dissolve the water-soluble $Na_2RuO_4$ and $NaAlO_2$, and then filtered to obtain a residue.

5) The residue obtained in step 4) was washed until the effluent reached a neutral pH. Next, 390 mL of 1 mol/L dilute nitric acid was added to completely dissolve the cobalt metal and cobalt oxide in the residue to obtain a cobalt nitrate solution.

6) The cobalt nitrate solution obtained in step 5) was adjusted to a $Co^{2+}$ concentration of 20 g/L. The pH of the solution was adjusted to 1.5 by using ammonium water with a mass fraction of 10%, and the temperature of the solution was adjusted to 70° C. The cobalt nitrate solution was slowly mixed with an oxalic acid solution at a pH of 1.5 and a temperature of 70° C. to precipitate cobalt ions as cobalt oxalate while ammonium water with a mass fraction of 5% was added to the solution to maintain the pH thereof at 1.5-1.7. After precipitation was completed, the obtained mixture was hot-filtered and the precipitate was washed with deionized water at a temperature of 65-80° C. until the effluent reached a neutral pH. The washed precipitate was dehydrated with absolute ethanol to obtain a pink cobalt oxalate precipitate. The oxalic acid solution used was prepared by: adding deionized water until 28.29 g of solid oxalic acid ($H_2C_2O_4$.2 $H_2O$) just dissolves, and adding 5% ammonium water to adjust the pH of the solution to 1.5.

7) The cobalt oxalate obtained in step 6) was dried in a dryer at 100° C., then transferred to a fluidized bed reactor and reduced in a mixed atmosphere containing $H_2$ and $N_2$ at a $H_2$-to-$N_2$ volume ratio of 1:1, a temperature of 400° C., a pressure of 1 MPa, and a space velocity of 4000 $h^{-1}$ for 4 hours to obtain cobalt metal.

8) The cobalt metal obtained in step 7) was dissolved in a sufficient amount of 1 mol/L dilute nitric acid. The obtained mixture was evaporated to obtain $Co(NO_3)_2$.6 $H_2O$. The $Co(NO_3)_2$.6 $H_2O$ was cooled in a dryer and then weighed. The obtained $Co(NO_3)_2$.6 $H_2O$ was 18.44 g, the purity of which measured by GBT 15898-1995 method was 99.18%. The recovery rate of cobalt was 97.96%.

9) The filtrate of step 4) and the effluent of step 5) were mixed. 11 mL of absolute ethanol was slowly, dropwise added to the mixture and stirred to produce black ruthenium hydroxide precipitate. The precipitate was filtered and washed with deionized water at a temperature of 65-80° C. until the effluent reached a neutral pH and did not contain sodium ions. After that, the precipitate was washed with absolute ethanol for three times.

10) The black ruthenium hydroxide precipitate obtained in step 9) was transferred to a three-necked flask equipped with stirring and refluxing devices. Concentrated hydrochloric acid with a mass fraction of 36-38% was added to the three-necked flask. The mixture was stirred at 91-95° C. for 1.5 hours. Next, 0.29 g of hydroxylammonium chloride was added to completely dissolve the black ruthenium hydroxide. The obtained solution was allowed to stand for a while, and then transferred to a distilling flask and vacuum-distilled at 40±1 kPa until the solution was converted into a paste. Next, vacuum distillation was stopped to allow the liquid in the paste to evaporate spontaneously to obtain 1.097 g of $\beta$-$RuCl_3$.x $H_2O$. ICP-AES method determined that the $\beta$-$RuCl_3$.x $H_2O$ had a ruthenium content of 37.06%. The recovery rate of ruthenium was 96.52%.

11) The filtrate obtained from the filtration of the ruthenium hydroxide precipitate and the effluent obtained from washing the precipitate in step 9) were mixed together. The mixture was heated to 40° C., and $CO_2$ having a purity higher than 99.0% was introduced into the mixture at a flow rate of 800 mL/min and stirred to produce white aluminum hydroxide precipitate. The reaction was completed when the pH of the solution reached 10.0. The precipitate was filtered and then washed with deionized water until the effluent reached a neutral pH and did not contain sodium ions. After that, the precipitate was washed with absolute ethanol for three times.

12) The aluminum hydroxide was dried at 100° C., then calcined at 700° C. to obtain 13.56 g of aluminum oxide having a purity of 99.07%. The recovery rate of aluminum was 94.26%.

Example 4

1) 20.18 g of loose particles of a spent Co—Ru/Al$_2$O$_3$ catalyst were provided. Elemental analysis determined that the catalyst contained Co 11.66%, Ru 0.96%, and Al 43.85%. The loose particles of the spent Co—Ru/Al$_2$O$_3$ catalyst were transferred to a muffle furnace and air was introduced into the muffle furnace. The catalyst particles were calcined at 450° C. for 4 hours to remove the heavy hydrocarbons on the surface thereof and then cooled down to room temperature.

2) The particles obtained in step 1) were ground into powders and then transferred to a fluidized bed reactor. The powders were heated in a mixed atmosphere containing H$_2$ and N$_2$ at a H$_2$-to-N$_2$ volume ratio of 1:1, a space velocity of 4000 h$^{-1}$, a pressure of 0.4 MPa, and a temperature of 500° C. for 8 hours.

3) The heated powders obtained in step 2) and alkali fusing agents were disposed into layers in a crucible. The layers disposed from the bottom of the crucible upward contained 30.95 g of KOH, the heated powders, 15.47 g of KOH, and 1.45 g of KNO$_3$, respectively. The crucible was then transferred to a muffle furnace. The muffle furnace was then heated at 200° C. for 1 hour. After that, the temperature of the muffle furnace was increased by 3° C./min to 960° C. using a temperature program. The muffle furnace was maintained at 960° C. to conduct an alkali fusion reaction for 4 hours. Next, the muffle furnace was cooled down to room temperature to obtain an alkali fusion product.

4) The alkali fusion product obtained in step 3) was leached in deionized water at 98° C. and a solid-to-liquid weight ratio of 1:3 for 1 hour to completely dissolve the water-soluble K$_2$RuO$_4$ and KAlO$_2$, and then filtered to obtain a residue.

5) The residue obtained in step 4) was washed until the effluent reached a neutral pH. Next, 320 mL of 1 mol/L dilute nitric acid was added to completely dissolve the cobalt metal and cobalt oxide in the residue to obtain a cobalt nitrate solution.

6) The cobalt nitrate solution obtained in step 5) was adjusted to a Co$^{2+}$ concentration of 20 g/L. The pH of the solution was adjusted to 1.5 by using ammonium water with a mass fraction of 10%, and the temperature of the solution was adjusted to 70° C. The cobalt nitrate solution was slowly mixed with an ammonium oxalate solution at a pH of 1.5 and a temperature of 70° C. to precipitate cobalt ions as cobalt oxalate while ammonium water with a mass fraction of 5% was added to the solution to maintain the pH thereof at 1.5-1.7. After precipitation was completed, the obtained mixture was hot-filtered and the precipitate was washed with deionized water at a temperature of 65-80° C. until the effluent reached a neutral pH. The washed precipitate was dehydrated with absolute ethanol to obtain a pink cobalt oxalate precipitate. The ammonium oxalate solution used was prepared by: adding deionized water until 22.68 g of solid ammonium oxalate ((NH$_4$)$_2$C$_2$O$_4$.H$_2$O) just dissolves, and adding 5% ammonium water to adjust the pH of the solution to 1.5.

7) The cobalt oxalate obtained in step 6) was dried in a dryer at 110° C., then transferred to a fluidized bed reactor and reduced in a mixed atmosphere containing H$_2$ and N$_2$ at a H$_2$-to-N$_2$ volume ratio of 4:1, a temperature of 480° C., a pressure of 0.8 MPa, and a space velocity of 1000 h$^{-1}$ for 3 hours to obtain cobalt metal.

8) The cobalt metal obtained in step 7) was dissolved in a sufficient amount of 1 mol/L dilute nitric acid. The obtained mixture was evaporated to obtain Co(NO$_3$)$_2$.6 H$_2$O. The Co(NO$_3$)$_2$.6 H$_2$O was cooled in a dryer and then weighed. The obtained Co(NO$_3$)$_2$.6 H$_2$O was 11.36 g, the purity of which measured by GBT 15898-1995 method was 99.72%. The recovery rate of cobalt was 97.48%.

9) The filtrate of step 4) and the effluent of step 5) were mixed. 12 mL of absolute ethanol was slowly, dropwise added to the mixture and stirred to produce black ruthenium hydroxide precipitate. The precipitate was filtered and washed with deionized water at a temperature of 65-80° C. until the effluent reached a neutral pH and did not contain potassium ions. After that, the precipitate was washed with absolute ethanol for three times.

10) The black ruthenium hydroxide precipitate obtained in step 9) was transferred to a three-necked flask equipped with stirring and refluxing devices. Concentrated hydrochloric acid with a mass fraction of 36-38% was added to the three-necked flask. The mixture was stirred at 91-95° C. for 1 hour. Next, 0.13 g of hydroxylammonium chloride was added to completely dissolve the black ruthenium hydroxide. The obtained solution was allowed to stand for a while, and then transferred to a distilling flask and vacuum-distilled at 40±1 kPa until the solution was converted into a paste. Next, vacuum distillation was stopped to allow the liquid in the paste to evaporate spontaneously to obtain 0.497 g of β-RuCl$_3$.x H$_2$O. ICP-AES method determined that the β-RuCl$_3$.x H$_2$O had a ruthenium content of 37.39%. The recovery rate of ruthenium was 95.87%.

11) The filtrate obtained from the filtration of the ruthenium hydroxide precipitate and the effluent obtained from washing the precipitate in step 9) were mixed together. The mixture was heated to 25° C., and CO$_2$ having a purity higher than 99.0% was introduced into the mixture at a flow rate of 500 mL/min and stirred to produce white aluminum hydroxide precipitate. The reaction was completed when the pH of the solution reached 10.0. The precipitate was filtered and then washed with deionized water until the effluent reached a neutral pH and did not contain potassium ions. After that, the precipitate was washed with absolute ethanol for three times.

12) The aluminum hydroxide was dried at 130° C., then calcined at 750° C. to obtain 15.76 g of aluminum oxide having a purity of 99.21%. The recovery rate of aluminum was 93.53%.

Examples 5-8

The recovery processes of Examples 5-8 were identical to that of Example 4, except for that the temperatures of the alkali fusion reactions were 951° C., 970° C., 980° C., and 990° C., respectively. The recovery results are listed in Table 1.

TABLE 1

|  |  | Example | | | |
|---|---|---|---|---|---|
|  |  | 5 | 6 | 7 | 8 |
| Alkali fusion temperature |  | 951° C. | 970° C. | 980° C. | 990° C. |
| Co(NO$_3$)$_2$•6H$_2$O | Weight | 11.56 g | 11.51 g | 11.33 g | 11.43 g |
|  | Purity | 99.02% | 99.38% | 99.65% | 99.23% |
|  | Recovery rate | 98.50% | 98.43% | 97.16% | 97.60% |
| β-RuCl$_3$•xH$_2$O | Weight | 0.501 g | 0.499 g | 0.490 g | 0.497 g |
|  | Ru content | 37.27% | 37.18% | 38.04% | 37.82% |
|  | Recovery rate | 96.48% | 95.79% | 96.26% | 97.03% |

TABLE 1-continued

| | | Example | | | |
|---|---|---|---|---|---|
| | | 5 | 6 | 7 | 8 |
| Aluminum oxide | Weight | 15.63 g | 15.78 g | 15.75 g | 16.00 g |
| | Purity | 99.27% | 99.51% | 99.36% | 99.78% |
| | Recovery rate | 92.77% | 93.89% | 93.62% | 94.92% |

The data of Examples 1-8 indicates that when the temperature of the alkali fusion reaction is 900-1000° C., the purity of recovered $Co(NO_3)_2.6\ H_2O$ is higher than 99%, and the recovery rates and purities of $\beta$-$RuCl_3.x\ H_2O$ and aluminum oxide are relatively high. Table 1 indicates that limiting the temperature of the alkali fusion reaction in the range of 950-1000° C. leads to a complete fusion of the ruthenium, the oxide thereof, and aluminum oxide with the alkali fusing agents. In this way, ruthenium and aluminum are completely separated from cobalt. This is necessary for achieving ideal recovery results.

Comparative Example 1

To explain the importance of the method for the alkali fusion and the temperature thereof, in this comparative example, a mixing alkali fusion method of the prior art was carried out and the temperature of this method was controlled at a value outside of the temperature range used in the method described herein.

20.04 g of a spent Co—Ru/$Al_2O_3$ catalyst was provided. Elemental analysis determined that the catalyst contained Co 30.05%, Ru 4.83%, and Al 27.90%. The recovery process was identical to that of Example 1, except for that step 3) was changed to: the heated powders obtained in step 2) and alkali fusing agents (31.67 g of KOH and 7.25 g of $KNO_3$) were mixed uniformly in a crucible. The crucible was transferred to a muffle furnace. The muffle furnace was then heated at 200° C. for 1 hour to achieve sufficient contact between the reactants. After that, the temperature of the muffle furnace was increased by 3° C./min to 650° C. using a temperature program. The muffle furnace was maintained at 650° C. to conduct an alkali fusion reaction for 4 hours. Next, the muffle furnace was cooled down to room temperature to obtain an alkali fusion product. The amount of the alkali fusing agents used was 2.5 times the theoretical amount thereof. The other steps were not changed from those of Example 1. The obtained $Co(NO_3)_2.6\ H_2O$ was 31.13 g, the purity of which measured by GBT 15898-1995 method was 94.34%. The recovery rate of cobalt was 98.75%. The obtained $\beta$-$RuCl_3.x\ H_2O$ was 2248 g. ICP-AES method determined that the $\beta$-$RuCl_3.x\ H_2O$ had a ruthenium content of 37.22%. The recovery rate of ruthenium was 86.43%. The obtained aluminum oxide was 9.45 g and had an $Al_2O_3$ content of 99.17%. The recovery rate of aluminum was 88.72%. Comparative example 1 indicates that the traditional mixing alkali fusion method at a relatively low temperature leads to a low purity of $Co(NO_3)_2.6\ H_2O$ and low recovery rates of ruthenium and aluminum due to incomplete alkali fusion reaction.

Comparative Example 2

To explain the importance of the temperature of the deionized water used for leaching the alkali fusion product, in this comparative example, the alkali fusion product was leached with deionized water at 80° C.

20.68 g of a spent Co—Ru/$Al_2O_3$ catalyst was provided. Elemental analysis determined that the catalyst contained Co 25.33%, Ru 3.07%, and Al 32.53%. The recovery process was identical to that of Example 2, except for that the alkali fusion product obtained in step 3) was leached with deionized water at 80° C. and a solid-to-liquid weight ratio of 1:2 for 1 hour. The other steps were not changed from those of Example 2. The obtained $Co(NO_3)_2.6\ H_2O$ was 25.31 g, the purity of which measured by GBT 15898-1995 method was 99.14%. The recovery rate of cobalt was 96.99%. The obtained $\beta$-$RuCl_3.x\ H_2O$ was 1.604 g. ICE AES method determined that the $\beta$-$RuCl_3.x\ H_2O$ had a ruthenium content of 37.63%. The recovery rate of ruthenium was 95.09%. The obtained aluminum oxide was 10.34 g and had an $Al_2O_3$ content of 99.35%. The recovery rate of aluminum was 80.81%.

Comparative example 2 indicates that leaching the alkali fusion product in deionized water at 80° C. leads to a low recovery rate of aluminum. It indicates that when the temperature of the deionized water used for leaching the alkali fusion product is lower than that of the method described herein, aluminate in the alkali fusion product cannot be completely leached out.

Comparative Example 3

To explain the importance of the parameters in adding oxalic acid or ammonium oxalate, the temperature for reducing cobalt oxalate, and the parameters for determining the end of the carbonation reaction for separating aluminum hydroxide, in this comparative example, these parameters were controlled at values different from those in the method described herein.

20.01 g of a spent Co—Ru/$Al_2O_3$ catalyst was provided. Elemental analysis determined that the catalyst contained Co 18.94%, Ru 2.11%, and Al 37.80%.

Steps 1)-5) were identical to those of Example 3.

In step 6), the cobalt nitrate solution obtained in step 5) was adjusted to a pH of 1.5 by using ammonium water with a mass fraction of 10%, and the temperature of the solution was adjusted to 70° C. An oxalic acid solution at a pH of 1.5 and a temperature of 70° C. was added to the cobalt nitrate solution and continuously stirred, and the pH of the mixture was adjusted to 1.5 by using ammonium water with a mass fraction of 5%. Next, the mixture was hot-filtered and the precipitate was washed with deionized water at a temperature of 65-80° C. until the effluent reached a neutral pH. The washed precipitate was dehydrated with absolute ethanol to obtain a pink cobalt oxalate precipitate. The oxalic acid solution used was prepared by: adding deionized water until 28.29 g of solid oxalic acid ($H_2C_2O_4.2\ H_2O$) just dissolves, and adding 5% ammonium water to adjust the pH of the solution to 1.5.

In step 7), the cobalt oxalate obtained in step 6) was dried in a dryer at 100° C., then transferred to a fluidized bed reactor and reduced in a mixed atmosphere containing $H_2$ and $N_2$ at a $H_2$-to-$N_2$ volume ratio of 1:1, a temperature of 300° C., a pressure of 1 MPa, and a space velocity of 4000 $h^{-1}$ for 4 hours to obtain cobalt metal.

Steps 8)-10) were identical to those of Example 3.

In step 11), the filtrate obtained from the filtration of the ruthenium hydroxide precipitate and the effluent obtained from washing the precipitate in step 9) were mixed together. The mixture was heated to 40° C., and $CO_2$ having a purity higher than 99.0% was introduced into the mixture at a flow rate of 800 mL/min and stirred to produce white aluminum hydroxide precipitate. The reaction was completed when the pH of the solution reached 11.5. The precipitate was filtered and then washed with deionized water until the effluent reached a neutral pH and did not contain sodium ions. After that, the precipitate was washed with absolute ethanol for three times.

Step 12) was identical to that of Example 3.

The obtained $Co(NO_3)_2 \cdot 6 H_2O$ was 17.03 g, the purity of which measured by GBT 15898-1995 method was 99.09%. The recovery rate of cobalt was 90.16%. The obtained β-$RuCl_3 \cdot x H_2O$ was 1,085 g. ICP-AES method determined that the β-$RuCl_3 \cdot x H_2O$ had a ruthenium content of 37.22%. The recovery rate of ruthenium was 95.61%. The obtained aluminum oxide was 11.47 g and had a purity of 99.04%. The recovery rate of aluminum was 79.47%.

Comparative example 3 indicates that traditional method of adding oxalic acid or ammonium oxalate at a relatively low temperature leads to a low recovery rate of cobalt; and that if carbonation for separating aluminum hydroxide is ended unsuitably, an incomplete reaction occurs and the recovery rate of aluminum is dramatically decreased.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method for recovering metal cobalt, ruthenium, and aluminum from a spent Co—Ru/$Al_2O_3$ catalyst, the method comprising:
   1) transferring loose particles of a spent Co—Ru/$Al_2O_3$ catalyst to a muffle furnace; then introducing air into the muffle furnace and calcining the loose particles at 350-500° C. for 3-6 hours to remove heavy hydrocarbons from surfaces of the loose particles; and then cooling the loose particles down to room temperature to obtain cooled particles;
   2) grinding the cooled particles of 1) into powders; then transferring the powders to a fluidized bed reactor; then purging the fluidized bed reactor with nitrogen for 0.5 hour; and then heating the powders in a mixed atmosphere containing $H_2$ and $N_2$ at a $H_2$-to-$N_2$ volume ratio of 1:1-4:1, a space velocity of 1000-4000 $h^{-1}$, a pressure of 0.1-1 MPa, and a temperature of 350-800° C. for 8-12 hours to obtain heated powders;
   3) disposing the heated powders of 2) and alkali fusing agents into layers in a crucible; then transferring the crucible to a muffle furnace; then heating the muffle furnace at 200° C. for 1 hour; then increasing a temperature of the muffle furnace by 3° C./min to a temperature falling within the range of 900-1000° C. using a temperature program; then maintaining the muffle furnace at the temperature falling within the range of 900-1000° C. to conduct an alkali fusion reaction for 2-4 hours; and then cooling the muffle furnace to room temperature to obtain an alkali fusion product;
   4) leaching the alkali fusion product of 3) in deionized water at a temperature of 90-100° C. and a solid-to-liquid weight ratio of 1:2-1:4 for 0.5-1 hour to dissolve water-soluble $K_2RuO_4$ and $KAlO_2$, or $Na_2RuO_4$ and $NaAlO_2$, in the alkali fusion product; and then filtering to obtain a residue and a first filtrate;
   5) washing the residue of 4) until a first effluent reaches a neutral pH and collecting the first effluent; and then adding excess dilute nitric acid to the residue to dissolve cobalt metal and cobalt oxide in the residue to obtain a cobalt nitrate solution;
   6) adjusting the cobalt nitrate solution of 5) to a $Co^{2+}$ concentration of 20 g/L, a pH of 1.5, and a temperature of 70° C.; then adding oxalic acid solution or ammonium oxalate solution at a pH of 1.5 and a temperature of 70° C. to the cobalt nitrate solution to precipitate cobalt ion as cobalt oxalate, wherein a molar amount of oxalic acid in the oxalic acid solution or a molar amount of ammonium oxalate in the ammonium oxalate solution is 3-4 times a molar amount of the cobalt ion; then hot-filtering to obtain a cobalt oxalate residue; then washing the cobalt oxalate residue with deionized water at a temperature of 65-80° C.; and then dehydrating the cobalt oxalate residue with absolute ethanol to obtain pink cobalt oxalate precipitate; wherein the pink cobalt oxalate precipitate is produced according to the following chemical reactions:

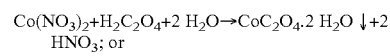

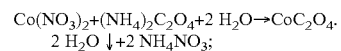

7) drying the pink cobalt oxalate precipitate of 6) in a dryer at 80-110° C.; then transferring the pink cobalt oxalate precipitate to a fluidized bed reactor; then purging the fluidized bed reactor with nitrogen for 0.5 hour; and then reducing the pink cobalt oxalate in a mixed atmosphere containing $H_2$ and $N_2$ at a $H_2$-to-$N_2$ volume ratio of 1:1-4:1, a temperature of 400-560° C., a pressure of 0.1-1 MPa, and a space velocity of 1000-4000 $h^{-1}$ for 2-4 hours to obtain cobalt metal; wherein the cobalt metal is produced according to the following chemical reaction:

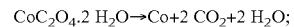

8) adding dilute nitric acid to the cobalt metal of 7) until the cobalt metal completely dissolves; and then evaporating to obtain $Co(NO_3)_2 \cdot 6 H_2O$;
   9) mixing the first filtrate of 4) and the first effluent of 5) to obtain a mixture; then dropwise adding absolute ethanol to the mixture and stirring to produce black ruthenium hydroxide precipitate; then filtering to separate a second filtrate from the black ruthenium hydroxide precipitate; then washing the black ruthenium hydroxide precipitate with deionized water at a temperature of 65-80° C. until a second effluent reached a neutral pH or does not contain potassium or sodium ions and collecting the second effluent; and then washing the black ruthenium hydroxide precipitate with absolute ethanol for three times to obtain ruthenium hydroxide; wherein the black ruthenium hydroxide precipitate is produced according to the following chemical reactions:

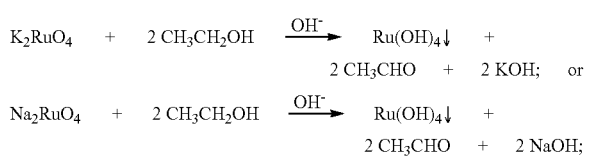

10) transferring the ruthenium hydroxide of 9) to a three-necked flask equipped with stirring and refluxing devices; then adding concentrated hydrochloric acid to the three-necked flask and stirring at 91-95° C. for 1-2 hours; then adding hydroxylammonium chloride to completely dissolve the ruthenium hydroxide to obtain a solution; then allowing the solution to stand; then transferring the solution to a distilling flask and vacuum-distilling at 40±1 kPa until the solution is converted into a paste; and then stopping vacuum distillation to allow a liquid in the paste to evaporate spontaneously to obtain β-RuCl$_3$.x H$_2$O; wherein the β-RuCl$_3$.x H$_2$O is produced according to the following chemical reactions:

$$Ru(OH)_4+4\ HCl \rightarrow RuCl_4+4\ H_2O;\ and$$

$$2\ RuCl_4+2\ NH_2OH\ HCl \rightarrow 2\ RuCl_3+N_2\uparrow+4\ HCl+2\ H_2O;$$

11) mixing the second filtrate and the second effluent of 9) to obtain a mixed liquid; then introducing CO$_2$ having a purity higher than 99.0% into the mixed liquid and stirring at a temperature of 25-95° C. to produce white aluminum hydroxide precipitate; then stopping reaction when a pH of the mixed liquid reaches 10.0; then filtering and washing the white aluminum hydroxide precipitate with deionized water at a temperature of 65-80° C. until a third effluent reaches a neutral pH or does not contain potassium or sodium ions; and then washing the white aluminum hydroxide precipitate with absolute ethanol for three times to obtain aluminum hydroxide; wherein the white aluminum hydroxide precipitate is produced according to the following chemical reactions:

$$2\ KAlO_2+CO_2+3\ H_2O \rightarrow K_2CO_3+2\ Al(OH)_3 \downarrow;\ or$$

$$2\ NaAlO_2+CO_2+3\ H_2O \rightarrow Na_2CO_3+2\ Al(OH)_3 \downarrow;\ and$$

12) drying the aluminum hydroxide of 11) at 80-130° C.; and then calcining at 500-750° C. to obtain aluminum oxide; wherein the aluminum oxide is produced according to the following chemical reaction:

$$2\ Al(OH)_3 \rightarrow Al_2O_3+3\ H_2O.$$

2. The method of claim 1, wherein:
the alkali fusing agents of 3) are KOH and KNO$_3$, or NaOH and NaNO$_3$;
the reactions occurring in 3) are:

$$RuO_2+2\ KOH+KNO_3 \rightarrow K_2RuO_4+KNO_2+H_2O;$$

$$Ru+2\ KOH+3\ KNO_3 \rightarrow K_2RuO_4+3\ KNO_2+H_2O;\ and$$

$$Al_2O_3+2\ KOH \rightarrow 2\ KAlO_2+H_2O;$$

or $$RuO_2+2\ NaOH+NaNO_3 \rightarrow Na_2RuO_4+NaNO_2+H_2O;$$

$$Ru+2\ NaOH+3\ NaNO_3 \rightarrow Na_2RuO_4+3\ NaNO_2+H_2O;\ and$$

$$Al_2O_3+2\ NaOH \rightarrow 2\ NaAlO_2+H_2O;\ and$$

an amount of the alkali fusing agents used is 2.5 times a theoretical amount thereof.

3. The method of claim 1, wherein:
the alkali fusion reaction in 3) is layered alkali fusion containing four layers;
from a bottom of the crucible upward, ⅔ of a total amount of KOH, the heated powders of 2), ⅓ of the total amount of KOH, and KNO$_3$ are disposed into layers; or from the bottom of the crucible upward, ⅔ of a total amount of NaOH, the heated powders of 2), ⅓ of the total amount of NaOH, and NaNO$_3$ are disposed into layers; and
layered alkali fusion avoids sintering and evaporation of RuO$_4$ for reducing loss of ruthenium.

4. The method of claim 1, wherein a temperature of the alkali fusion reaction in 3) is 950-1000° C. for achieving complete reaction of ruthenium and aluminum oxide with the alkali fusing agents.

5. The method of claim 1, wherein a reaction time of the alkali fusion reaction in 3) is 3 hours.

6. The method of claim 1, wherein in 4), the alkali fusion product is leached in deionized water at a temperature of 96-100° C. for completely leaching out ruthenate and aluminate in the alkali fusion product.

7. The method of claim 1, wherein in 4), the solid-to-liquid weight ratio is 1:3.

8. The method of claim 1, wherein a concentration of the dilute nitric acid in 5) and 8) is 1-3 mol/L.

9. The method of claim 1, wherein in 6), the oxalic acid solution or ammonium oxalate solution is slowly, dropwise added to the cobalt nitrate solution while 5% ammonium water is added to maintain a pH of the cobalt nitrate solution at 1.5-1.7 to completely precipitate cobalt ions in the cobalt nitrate solution to achieve a high recovery rate of cobalt.

10. The method of claim 1, wherein a temperature for reducing cobalt oxalate in 7) is 400-480° C.

11. The method of claim 1, wherein in 9):
the absolute ethanol is excess to completely convert ruthenate into ruthenium hydroxide precipitate; and
a molar ratio of ruthenate in the mixture to the absolute ethanol is 1:3-1:5.

12. The method of claim 1, wherein the concentrated hydrochloric acid in 10) has a mass fraction of 36-38%.

13. The method of claim 1, wherein in 10), a molar ratio of the hydroxylammonium chloride to the ruthenium hydroxide is 1:1 for obtaining β-RuCl$_3$.x H$_2$O having a high purity.

14. The method of claim 1, wherein in 11), the CO$_2$ is introduced into the mixed liquid and stirred at a temperature of 65-85° C. to produce aluminum hydroxide having a large particle size that is easy to filter out.

15. The method of claim 1, wherein in 11), a flow rate of the CO$_2$ is 500-1500 mL/min.

16. The method of claim 2, wherein:
the alkali fusion reaction in 3) is layered alkali fusion containing four layers;
from a bottom of the crucible upward, ⅔ of a total amount of KOH, the heated powders of 2), ⅓ of the total amount of KOH, and KNO$_3$ are disposed into layers; or from the bottom of the crucible upward, ⅔ of a total amount of NaOH, the heated powders of 2), ⅓ of the total amount of NaOH, and NaNO$_3$ are disposed into layers; and
layered alkali fusion avoids sintering and evaporation of RuO$_4$ for reducing loss of ruthenium.

17. The method of claim 2, wherein a temperature of the alkali fusion reaction in 3) is 950-1000° C. for achieving complete reaction of ruthenium and aluminum oxide with the alkali fusing agents.

18. The method of claim 2, wherein a reaction time of the alkali fusion reaction in 3) is 3 hours.

* * * * *